United States Patent [19]

Dixon

[11] Patent Number: 5,611,134

[45] Date of Patent: Mar. 18, 1997

[54] MECHANICAL SAFETY WEDGELOCK AND METHOD OF ASSEMBLY WITH A TOOL HANDLE

[76] Inventor: Randy L. Dixon, 454 W. Oak St., Shelley, Id. 83774

[21] Appl. No.: 664,930

[22] Filed: May 29, 1996

Related U.S. Application Data

[63] Continuation-in-part of Ser. No. 409,146, Mar. 23, 1995, abandoned.

[51] Int. Cl.$^6$ .................................................. B23P 11/02
[52] U.S. Cl. .............................. 29/525.11; 81/20; 81/489; 403/248; 403/256
[58] Field of Search ............................. 29/525.11; 81/20, 81/489, 492; 16/110 R, 113; 30/308.1, 308.2, 308.3; 403/297, 256, 248, 260

[56] References Cited

U.S. PATENT DOCUMENTS

| | | | |
|---|---|---|---|
| 898,950 | 9/1908 | Wyatt | 403/248 |
| 954,259 | 4/1910 | Covert | 403/248 |
| 1,115,637 | 11/1914 | Willett . | |
| 1,518,259 | 12/1924 | Filiatreault | 81/20 |
| 4,096,895 | 6/1978 | Fernitz . | |
| 4,144,919 | 3/1979 | Miller | 81/20 |
| 4,669,342 | 6/1987 | Wilson . | |

Primary Examiner—David P. Bryant
Attorney, Agent, or Firm—R. L. Dixon

[57] ABSTRACT

A retaining device for connecting a tool with an eye of varying geometry to the mating geometry of a tool handle. The retaining device includes: the eye of the tool; the end of the handle; lock wedges with a clearance hole and reaction surface; and a wedge bar of two or more integral bosses with threaded through holes, and one or more integral wedges. The lock wedge reaction surfaces are placed in the reaction surfaces of the handle with the narrow end of the lock wedge toward the slot(s) in the end of the handle. The handle and lock wedges are placed in the eye mating the lock wedges and lock wedge sloping surfaces. The wedge bar is oriented and placed in the slot(s) in the end of the handle; the fasteners are inserted through the lock wedge through hole, through the eye, and engaged in the threaded holes of the wedge bar. The fasteners are then tightened. As the fasteners are tightened; the wedge bar, and lock wedges and handle, are simultaneously drawn into the opposite ends of the eye. As the wedge bar is being drawn into the eye it is also being drawn into the slot in the end of the handle. The wedge bar spreads the segments of the end of the handle, and ultimately compresses and captures the handle segments between the wedge bar and the wedge bar sloping surfaces of the eye.

8 Claims, 6 Drawing Sheets

MECHANICAL SAFETY WEDGELOCK AND METHOD OF ASSEMBLY WITH A TOOL HANDLE

This is a continuation-in-part of Ser. No. 08/409,146, filed Mar. 23, 1995, now abandoned.

BACKGROUND OF THE INVENTION

1. Field of the Invention

The subject invention generally pertains to attaching handles to tools, and more specifically to attaching handles to tools using an eye and wedges.

2. Description of Related Art

Currently handles are secured to tools with a variety of methods.

(1) One method utilizes an eye in the tool that is tapered larger from the center of the eye toward both open ends of the eye, such as striking tools and the like, and a handle whose geometry matches the entrances taper of the eye. The handle is driven into the entrance end of the eye, and wedges are driven into the protruding end of the handle. These wedges expand the end of the handle to conform to the taper of the eye, trapping the handle in the eye.

(2) An improvement on method 1, utilizes the same type of tapered eye and handle. A ferrule is riveted to the bottom of the head; this ferrule bears against wedge shaped handle clamps, which bear against a taper on the handle. See U.S. Pat. No. 1,115,637.

(3) Another method uses an eye with the exit end of the eye smaller than the entrance end of the eye, and a handle that is of matching taper, such as a pickax and the like. The handle is inserted butt-end first into the entrance end of the eye and travels through the eye until the handle wedges tightly into the eye.

(4) An improvement on method 3, utilizes the same type of tapered eye and handle; 'J' bolts and a cross bar are used to secure the handle in the tool on a more permanent basis. See U.S. Pat. No. 4,669,342.

(5) Another method uses a tapered eye which has an exit end smaller than the entrance end of the eye, a handle with an assembly end that matches that taper, and has two through holes longitudinal with that taper; and a plate larger than the exit end of the eye with two through holes that mate to the through holes in the handle taper. The assembly end of the handle is inserted into the eye; the plate is placed over the exit end of the eye. The tool and handle are held together by passing long screws through the holes in the plate and the holes in the tapered end of the handle, and securing with nuts and lockwasheres that bear against shoulders on the exposed handle taper. See U.S. Pat. No. 4,096,895.

(6) Other systems use a ferrule over the hollowed out attaching end of the handle, such as pitchforks and hoes and the like. The shank of the tool is pressed into the end of the ferrule covered handle, expanding the handle to fit the ferrule.

(7) Some systems use chemical epoxies to assemble handles to tools, such as striking tools and the like.

(8) Some handles are mechanically forced into a hole in the tool then soldered, such as striking tools and the like.

(9) Some tools have an integral ferrule, such as shovels and the like. The handle is inserted into the ferrule, and the two are cross-riveted together.

(10) Some methods use a form of threaded fastener between the end of the handle and the eye of the tool, such as sweeping tools and the like.

(11) Some methods use a combination of the methods mentioned.

The disadvantages of method 1: the wedges work loose due to stress on the handle; the wedges work loose due to changes in the size of the handle because of moisture content or temperature variations; once the wedges work loose they tend to work loose easier the next time; additional wedges may be inserted to tighten the assembly but they must be either kept on hand for insertion or procured as needed; inserting additional wedges into the handle is only a temporary fix, eventually the handle becomes damaged enough to be unsafe and must be replaced; replacing a handle due to breakage, or for safety reasons, is difficult because wedges are meant to go in, not out, and cannot be easily removed; the end of the handle cannot be readily removed from the tool because the handle is larger on either end of the eye and smaller in the center of the eye. To remove a handle of this sort from the tool requires several different additional repair type tools and nearly an hour of time.

The disadvantages of method 2: identical to the the disadvantages of the first. The advantage that the second method offers is preventing the tool from coming off inadvertently. Tightening the attachment is accomplished with wedges similar to method 1.

The disadvantage of method 3: during use the tool must be continually checked to ensure that is secure. The tool can become loose at the most inopportune time and injure the hand, arm, or head of the user.

The disadvantage of method 4: the 'J' bolts protrude beyond the head of the tool where, unbeknownst to the user, they may shear off during normal use; in which case the tool reverts to method 2.

The disadvantages of method 5: the plate over the exit end of the eye could be sheared off during normal use, and the tool would immediately become separated from the handle creating a safety hazard; the design limits the types of materials for the handle due to the stresses that the screws induce on the shoulders of the tapered end.

The disadvantage of method 6: the handle can work loose through use or changes in moisture content or temperature variations, causing the handle and tool to separate unexpectedly. Such unexpected separation can cause the user to over exert and strain muscles. Replacing a handle of this sort can be accomplished, but should be done with special tools for best results.

The disadvantages of method 7: epoxies eventually weather and crack to the extent that they loosen or fall out of the eye, and the tool inadvertently comes off. Repairing an attachment of this sort or replacing the handle involves hazardous materials, which require specific and expensive handling and disposal methods.

The disadvantage of method 8: if the handle or tool becomes damaged, the entire tool must be replaced.

The disadvantage of method 9: it is difficult to replace the old handle without several different tools.

The disadvantages of method 10: one or both members of the threaded type fastener is made of wood, such threaded fasteners are not as durable as the tool or the handle in which they are placed; damage to the threads on either the handle or tool requires replacing the damaged member; a threaded type of securing method will come undone should the tool need to be rotated with the handle, rotating the assembly in the wrong direction will loosen the connection.

The disadvantage of method 11 are a combination of the disadvantages of whatever methods are involved.

SUMMARY OF THE INVENTION

To avoid the problems with present methods of securing handles to tools, it is an object of the subject invention to provide a method of securing handles to tools by mimimizing the number of tools required to accomplish the attachment.

Another object of the invention is to provide a positive connection between a tool and a handle.

Another object of the invention, should the connection become unsecure, is to provide an easy method of resecuring the connection.

Another object of the invention is to provide an easy method of replacing a handle by initially providing a handle and wedges that are designed to be easily removed.

Another object of the invention is to eliminate the use of hazardous chemicals in the method of connection.

Another object of the invention is to eliminate the necessity of replacing both tool and handle should either one become damaged.

Another object of the invention is to provide for a method of disconnecting tool and handle and being able to safely reconnect both if desired.

Another object of the invention is to provide for the use of a wide variety of materials for the handle.

Another object of the invention is to provide for a margin of safety in the event that fasteners break.

These and other objects of the invention are provided by a novel eye with at least two pair of opposing sloping surfaces, novel mating wedges, novel securing end on a handle, and fasteners.

DESCRIPTION OF THE PREFERRED EMBODIMENT

Figure 1:
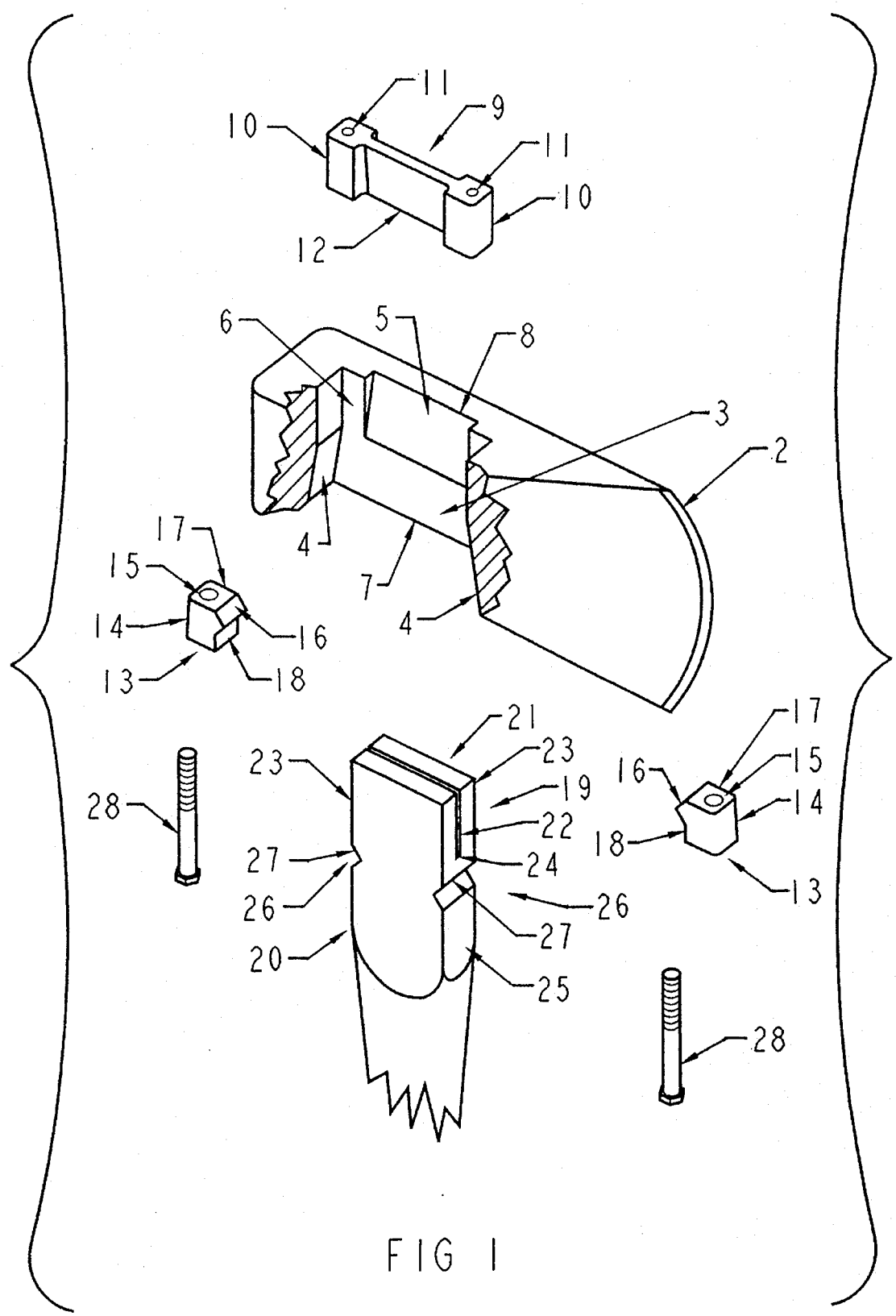
FIG. 1 is an exploded view of a connecting mechanism utilizing two bosses connected by a single wedge bar.
Figure 2A:
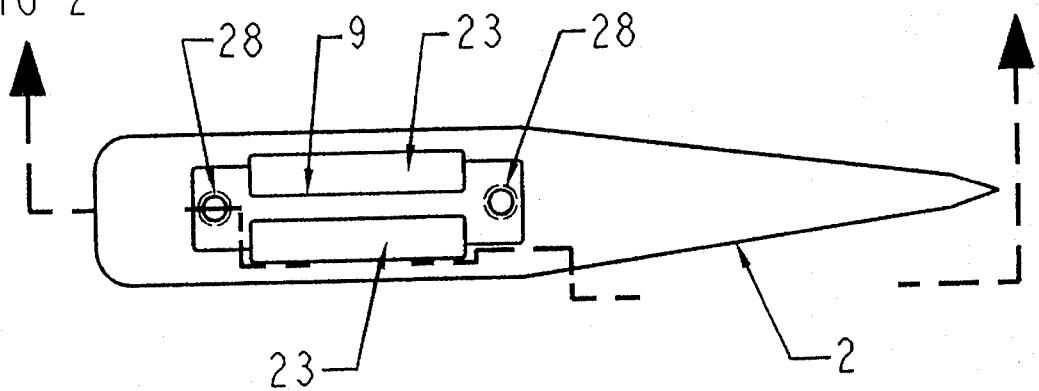
FIG. 2A is an assembled top view of the mechanism depicted in FIG. 1.
Figure 2:
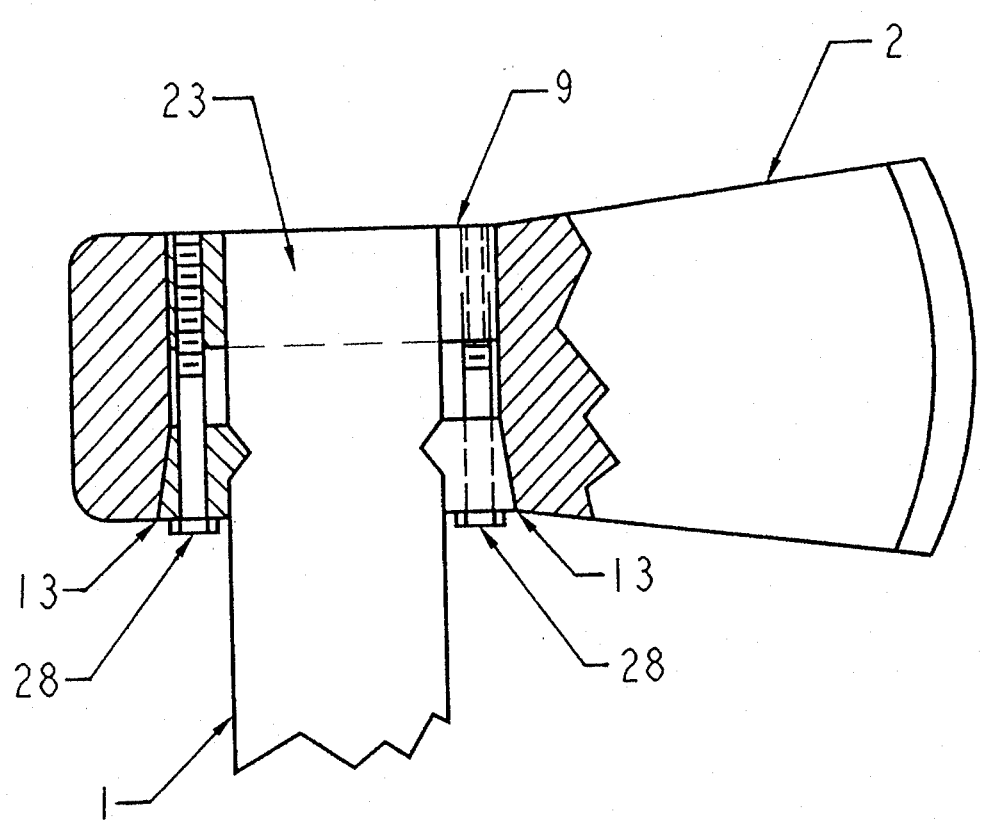
FIG. 2 is a cross sectional view taken in the direction of the arrows shown in FIG. 2A.
Figure 3:
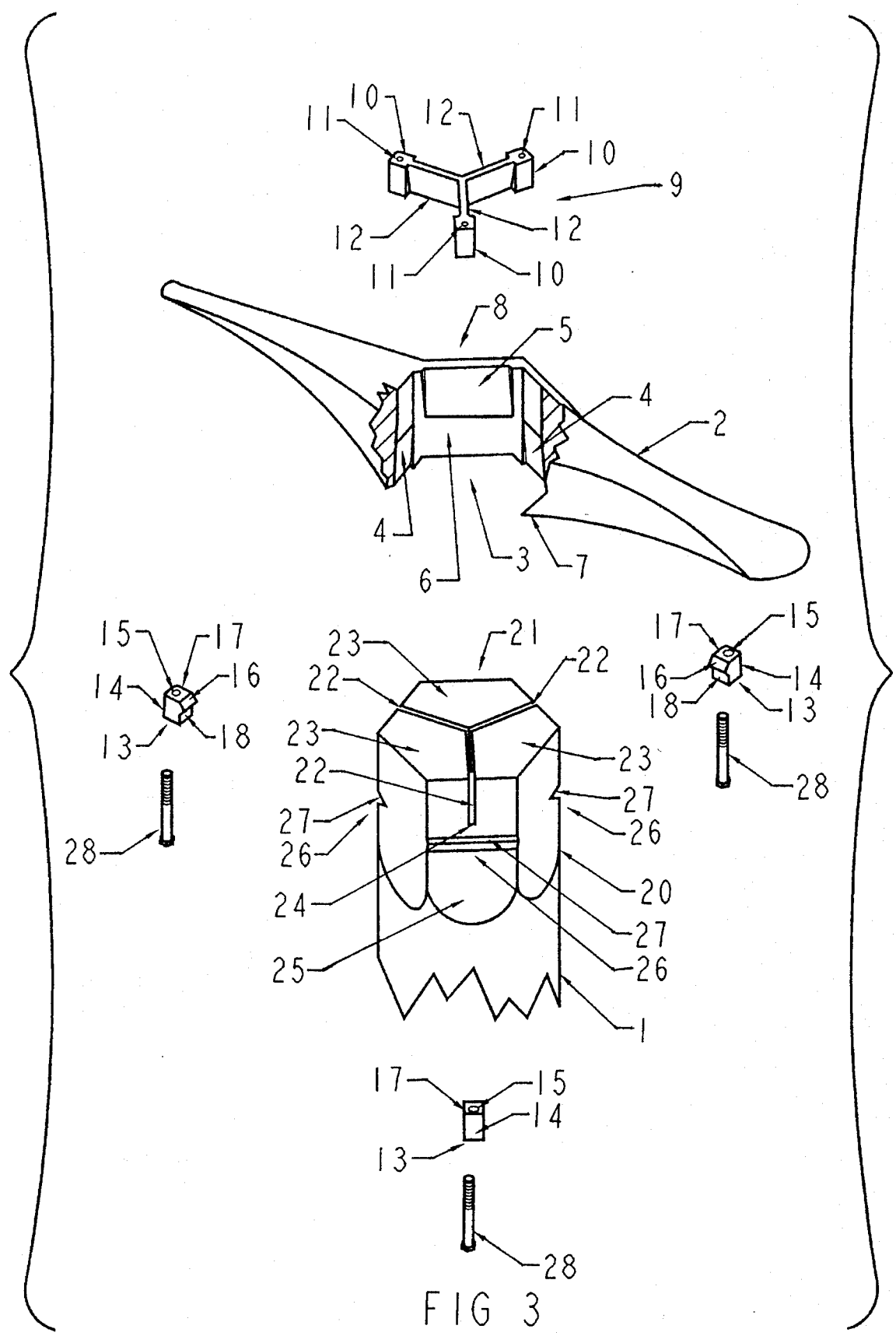
FIG. 3 is an exploded view of a connecting mechanism utilizing three bosses connected by three wedge bars.
Figure 4:
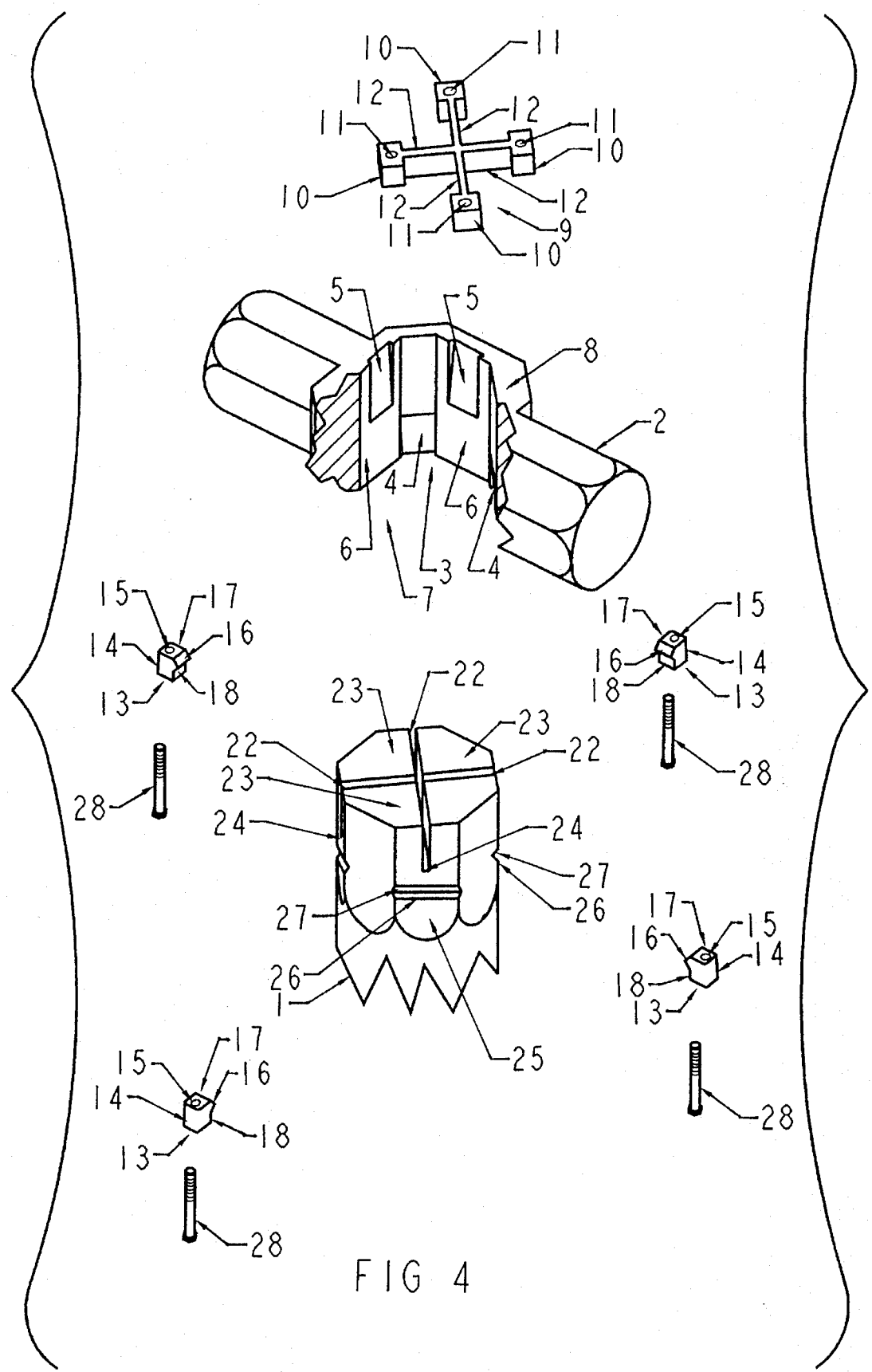
FIG. 4 is an exploded view of a connecting mechanism utilizing four bosses connected by four wedge bars.
Figure 4A:
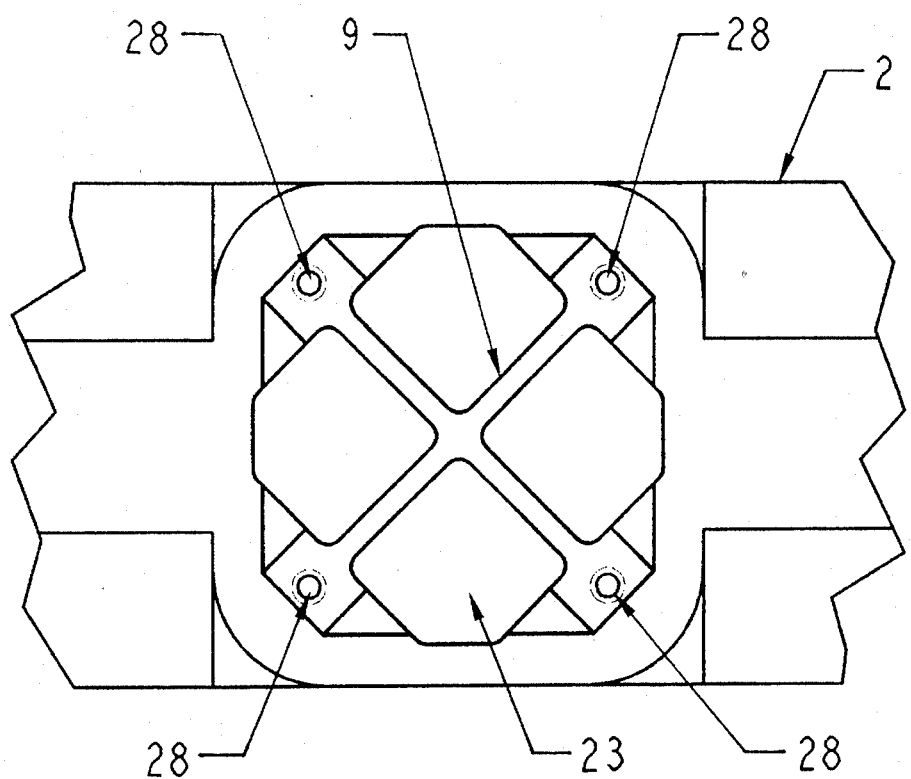
FIG. 4A is an assembled top view of the mechanism depicted in FIG. 4
Figure 4B:
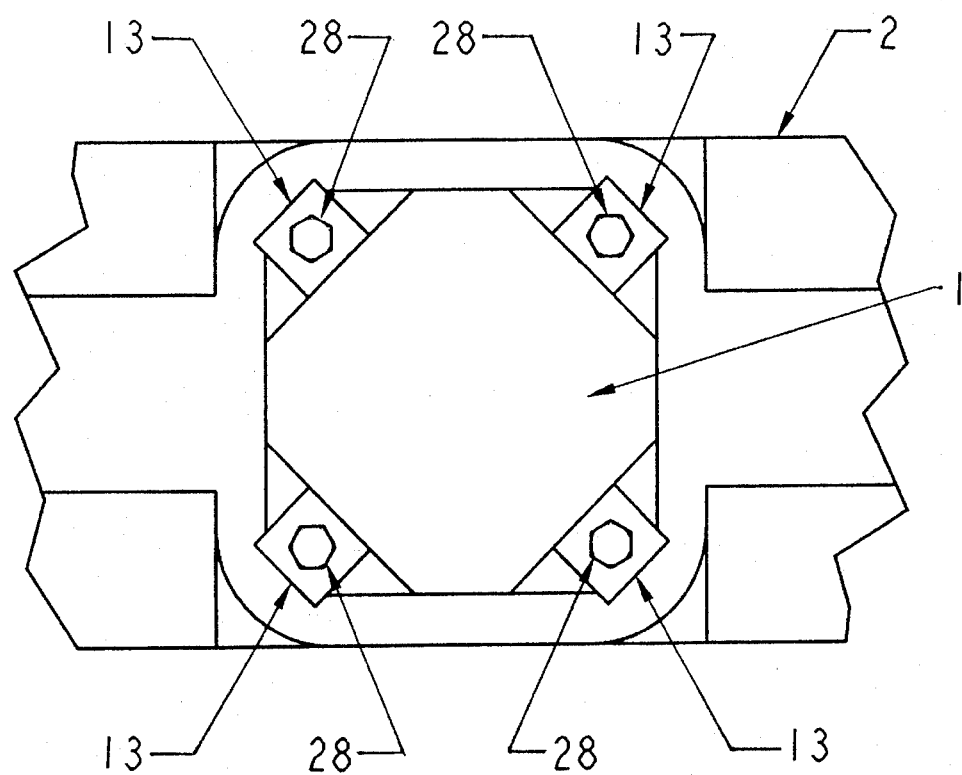
FIG. 4B is an assembled bottom view of the mechanism depicted in FIG. 4.

Referring to FIGS. 1–4B, a method for attaching a handle 1 to a tool 2, utilizing a through eye 3 of various geometries which incorporate lock wedge sloping surfaces 4 and wedge bar sloping surfaces 5. The lock wedge sloping surfaces 4 are on the interior surface 6 of the entrance end 7 of the eye 3. The wedge bar sloping surfaces 5 are on the interior surface 6 of the exit end 8 of the eye 3. The wedge bar 9, when properly oriented, will pass freely throuth the eye 3.

The wedge bar 9 consists of multiple integral bosses 10 each with a threaded through hole 11, the bosses are connected by one or more symmetrically tapered wedges 12.

The lock wedge 13, consists of an assymmetrically tapered wedge 14 with a longitudinal clearance hole 15, and a cross reaction surface 16 on the narrow end 17 of the right angle surface 18.

The eye portion 19 of the handle 1, is geometrically shaped to mate with the eye 3 of the tool 2, for a length 20 equal to the depth of the eye 3. The end of the handle 21 is slotted 22 into handle segments 23, to mate with the wedge bar 9, for a depth 24 greater than the depth of the wedge 12 of the wedge bar 9. The lock wedge mating surfaces 25 of the handle 1 each have a cross reaction surface 26 located so as to provide a reaction surface 27 for the lock wedge cross reaction surface 16 when the handle 1 and lock wedges 13 interact within the eye 3.

The last items of the invention are threaded fasteners 28 whose effective length is the same as the length of the eye 3 from entrance end 7 to exit end 8.

To assemble the invention, mate the lock wedge cross reaction surface 16 with the cross reaction surfaces 26 of the handle 1 keeping the narrow end 17 of the lock wedge 13 toward the end 21 of the handle 1; insert the handle 1 and the lock wedges 13 into the eye 3, mating the lock wedges 13 with the lock wedge sloping surfaces 4 of the eye 3. Orient the wedge bar 9 and place it in the slot 22 or slots 22 in the end 21 of the handle 1. Insert the fasteners 28 through the lock wedge clearance holes 15, and engage them in the threaded holes 11 of the wedge bar 9. Tighten the fasteners 28. As the fasteners 28 are tightened; the wedge bar 9, and lock wedges 13 and handle 1, are simultaneously drawn into the opposite ends of the eye 3. As the wedge bar 9 is being drawn into the eye 3, it is also being drawn into the slot(s) 22 in the end of the handle 1. The wedge bar 9 spreads the segments 23 of the end of the handle 21, and ultimately compresses and captures the handle segments 23 between the wedge bar 9 and the wedge bar sloping surfaces 4 of the eye 3. As the lock wedges 13 are drawn into the eye 3 they perform two functions: drawing the handle 1 into the eye 3 by reacting with the reaction surfaces 26 of the handle 1, and compressing the handle 1 between them by reacting with the lock wedge sloping surfaces 4. The combined actions of the wedge bar 9 and lock wedges 13 lock tool and handle 1 securely together.

Should the connection become loose, tightening the threaded fasteners 28 will re-secure the connection. Should the fasteners 28 fail, the spread end of the handle 21 will have taken a 'set' in the spread position preventing the tool 2 from inadvertently separating from the handle 1.

Should the handle 1 and tool 2 need to be disconnected; loosen the fasteners 28 and gently tap on them to free the wedge bar 9, remove the fasteners 28 and wedge bar 9. Holding the tool 2 securely with the exit end 8 of the eye 3 accessible and the handle 1 free, press on or strike the end 21 of the handle 1 until it exits the entrance end 7 of the eye 3.

Figure 3A:
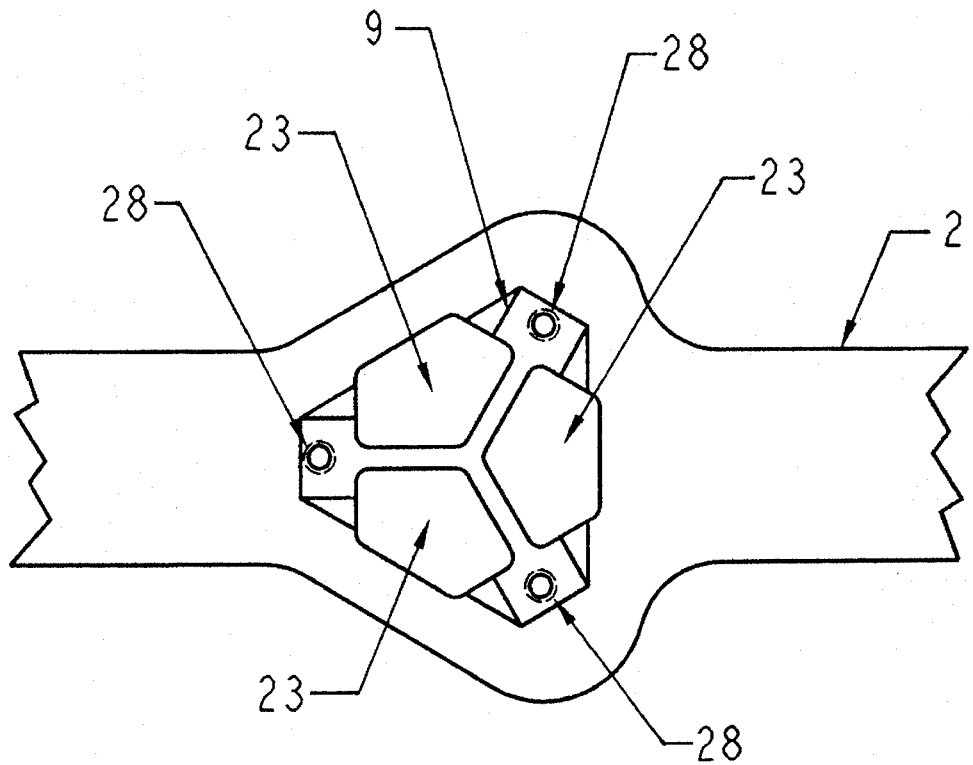
FIG. 3A is an assembled top view of the mechanism depicted in FIG. 3.
Figure 3B:
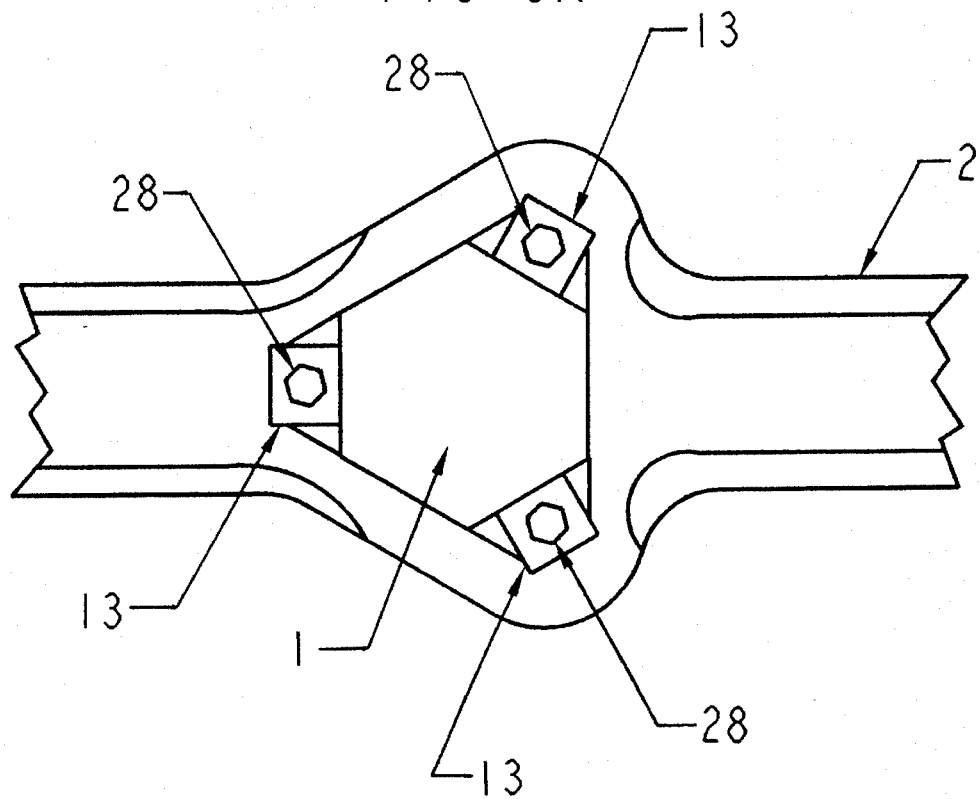
FIG. 3B is an assembled bottom view of the mechanism depicted in FIG. 3.

Alternate constructions are shown in FIGS. 3, 3A, 3B, 4, 4A and 4B. The mechanism 21 could incorporate greater numbers of sloping surfaces 4 and 5, bosses 10, wedge bars 12, lock wedges 13, and slots 22; practicality being the determining factor in the number.

Although the invention is described with respect to a preferred embodiment, modifications thereto will be apparent to those skilled in the art. Therefore, the scope of the invention is to be determined by reference to the claims which follow.

I claim:

1. A tool and handle interconnection for improved safety, comprising:

a tool with an eye of substantially rectangular cross section, said eye including a pair of opposing wedge bar sloping surfaces in one end thereof, and a pair of opposing lock wedge sloping surfaces in an opposite end thereof, said pairs of sloping surfaces being oriented 90 degrees apart about a longitudinal through axis of said eye;

a handle including an end of substantially rectangular cross section, said end being inserted within said eye and including a vertical slot therein extending substantially parallel to said wedge bar sloping surfaces of said eye and dividing said end into two connected segments, and a pair of notches formed in opposite sides of said end and disposed below said vertical slot;

a wedge bar comprising two bosses connected by a tapered wedge, each of said bosses including a longitudinal threaded through hole, said tapered wedge of said wedge bar being positioned within said vertical slot of said handle between said connected segments;

a pair of tapered lock wedges, each lock wedge including a longitudinal through hole and a protrusion extending from one side of said lock wedge which mates with and is inserted within a corresponding notch in said handle; and a pair of threaded fasteners, each fastener extending through the through hole of a corresponding lock wedge and through said eye of said tool and being engaged within the threaded through hole of a corresponding boss of said wedge bar;

whereby when said threaded fasteners are tightened, said wedge bar is drawn toward said lock wedges, forcing each of said connected segments of said handle against a corresponding wedge bar sloping surface of said eye, and forcing each of said lock wedges against a corresponding lock wedge sloping surface of said eye.

2. A tool and handle interconnection for improved safety, comprising:

a tool with an eye of a first cross section, said eye including a plurality of wedge bar sloping surfaces in one end thereof, and a plurality of lock wedge sloping surfaces in an oposite end thereof;

a handle including an end of a second cross section complementary to said first cross section, said end being inserted within said eye and including a plurality of vertical slots therein dividing said end onto a plurality of connected segments, and a plurality of notches formed about the perimeter of said end and disposed below said vertical slots;

a wedge bar comprising a plurality of bosses connected by a tapered wedge structure, each of said bosses including a longitudinal threaded through hole, said tapered wedge structure of said wedge bar being positioned within said vertical slots of said handle between said connected segments;

a plurality of tapered lock wedges, each lock wedge including a longitudinal through hole and a protrusion extending from one side of said lock wedge which mates with and is inserted within a corresponding notch in said handle; and a plurality of threaded fasteners, each fastener extending through the through hole of a corresponding lock wedge and through said eye of said tool and being engaged within the threaded through hole of a corresponding boss of said wedge bar;

whereby when said threaded fasteners are tightened, said wedge bar is drawn toward said lock wedges, forcing each of said connected segments of said handle against a corresponding wedge bar sloping surface of said eye, and forcing each of said lock wedges against a corresponding lock wedge sloping surface of said eye.

3. A method for connecting a tool to a handle comprising:

providing a tool with an eye of substantially rectaangular cross section, said eye including a pair of opposing wedge bar sloping surfaces in one end thereof, and a pair of opposing lock wedge sloping surfaces in an opposite end thereof, said pairs of sloping surfaces being oriented 90 degrees apart about a longitudinal through axis of said eye;

providing a handle including an end of substantially rectangular cross section with a vertical slot therein dividing said end into two connected segments, and a pair of notches formed in opposite sides of said end and disposed below said vertical slot;

providing a wedge bar comprising two bosses connected by a tapered wedge, each of said bosses including a longitudinal threaded through hole;

providing a pair of tapered lock wedges, each lock wedge including a longitudinal through hole and a protrusion extending from one side of said lock wedge which is shaped to mate with a corresponding notch in said handle;

providing a pair of threaded fasteners;

inserting each of said lock wedges within a corresponding notch in said handle;

inserting said handle and said inserted lock wedges within said eye of said tool such that each of said lock wedges are adjacent a corresponding lock wedge sloping surface;

inserting said tapered wedge of said wedge bar into said eye of said tool and within said vertical slot of said handle between said connected segments;

inserting each of said fasteners through the through hole of a corresponding lock wedge and through said eye of said tool and into engagement with the threaded through hole of a corresponding boss of said wedge bar; and tightening said threaded fasteners, such that said wedge bar is drawn toward said lock wedges, forcing each of said connected segments of said handle against a corresponding wedge bar sloping surface of said eye, and forcing each of said lock wedges against a corresponding lock wedge sloping surface of said eye.

4. A method according to claim 3, wherein the tool can be disassembled from the handle by loosening said threaded fasteners from threaded engagement with said wedge bar, and removing said threaded fasteners, said wedge bar, said lock wedges, and said handle from within said eye of said tool.

5. A method according to claim 4, wherein said tool, said handle, said wedge bar, said lock wedges, and said threaded fasteners are reusable after disassembly.

6. A method for connecting a tool to a handle comprising:

providing a tool with an eye of a first cross section, said eye including a plurality of wedge bar sloping surfaces in one end thereof, and a plurality of lock wedge sloping surfaces in an opposite end thereof;

providing a handle including an end of a second cross section complementary to said first cross section with a plurality of vertical slots therein dividing said end into a plurality of connected segments, and a plurality of notches formed about the perimeter of said end and disposed below said vertical slots;

providing a wedge bar comprising a plurality of bosses connected by a tapered wedge structure, each of said bosses including a longitudinal threaded through hole;

providing a plurality of tapered lock wedges, each lock wedge including a longitudinal through hole and a protrusion extending from one side of said lock wedge which is shaped to mate with a corresponding notch in said handle;

providing a plurality of threaded fasteners;

inserting each of said lock wedges within a corresponding notch in said handle;

inserting said handle and said inserted lock wedges within said eye of said tool such that each of said lock wedges are adjacent a corresponding lock wedge sloping surface;

inserting said tapered wedge structure of said wedge bar into said eye of said tool and within said vertical slots of said handle between said connected segments;

inserting each of said fasteners through the through hole of a corresponding lock wedge and through said eye of said tool and into engagement with the threaded through hole of a corresponding boss of said wedge bar; and tightening said threaded fasteners, such that said wedge bar is drawn toward said lock wedges, forcing each of said connected segments of said handle against a corresponding wedge bar sloping surface of said eye, and forcing each of said lock wedges against a corresponding lock wedges sloping surface of said eye.

7. A method according to claim 6, wherein the tool can be disassembled from the handle by loosening said threaded fasteners from threaded engagement with said wedge bar, and removing said threaded fasteners, said wedge, bar, said lock wedges, and said handle from within said eye of said tool.

8. A method according to claim 7, wherein said tool, said handle, said wedge, bar, said lock wedges, and said threaded fasteners are reusable after disassembly.

* * * * *